United States Patent [19]

Dziubakowski et al.

[11] Patent Number: 4,593,477

[45] Date of Patent: Jun. 10, 1986

[54] CONTROL SYSTEM FOR A FLUIDIZED BED

[75] Inventors: Donald J. Dziubakowski, Seven Hills; John W. Smith, Massillon, both of Ohio

[73] Assignee: The Babcock & Wilcox Company, New Orleans, La.

[21] Appl. No.: 691,339

[22] Filed: Jan. 14, 1985

Related U.S. Application Data

[63] Continuation-in-part of Ser. No. 450,508, Dec. 16, 1982, abandoned.

[51] Int. Cl.⁴ ............................................. F26B 3/08
[52] U.S. Cl. .................................... 34/10; 34/15; 34/54; 34/57 A; 73/301
[58] Field of Search ........................ 73/299, 301, 714; 364/509, 571; 340/614; 34/25, 52, 57 A, 10; 137/558

[56] References Cited

U.S. PATENT DOCUMENTS

| | | | |
|---|---|---|---|
| 2,791,906 | 5/1957 | Vetter | 73/301 X |
| 3,064,357 | 11/1962 | Butters | 34/52 |
| 3,186,102 | 6/1965 | Brociner et al. | 34/57 A X |
| 3,473,379 | 10/1969 | Stephens et al. | 73/301 X |
| 3,849,901 | 11/1974 | Sietmann et al. | 34/52 X |
| 3,973,437 | 8/1976 | Yanagihara et al. | 73/301 X |
| 4,006,635 | 2/1977 | Khoi | 73/301 X |

OTHER PUBLICATIONS

"Functional Diagramming of Instruments and Control Systems", Bailey Controls, SAMA Standard RC22-1-1-1966, (1981), pp. 1-12.

Primary Examiner—Daniel M. Yasich
Attorney, Agent, or Firm—Vytas R. Matas; Robert J. Edwards

[57] ABSTRACT

A system for controlling the bed level of a fluidized bed independent of the density of the bed material using a minimum number of pressure sensors is disclosed. A pressure sensor is positioned at the base of the bed, at approximately eight feet above the distributor plate, and at one or more intermediate locations therebetween. The measurements from the foregoing sensors are selectively processed through the use of a specific logic arrangement to produce an output signal representative of the bed level of the fluidized bed.

14 Claims, 2 Drawing Figures

FLUIDIZED BED
SCHEMATIC

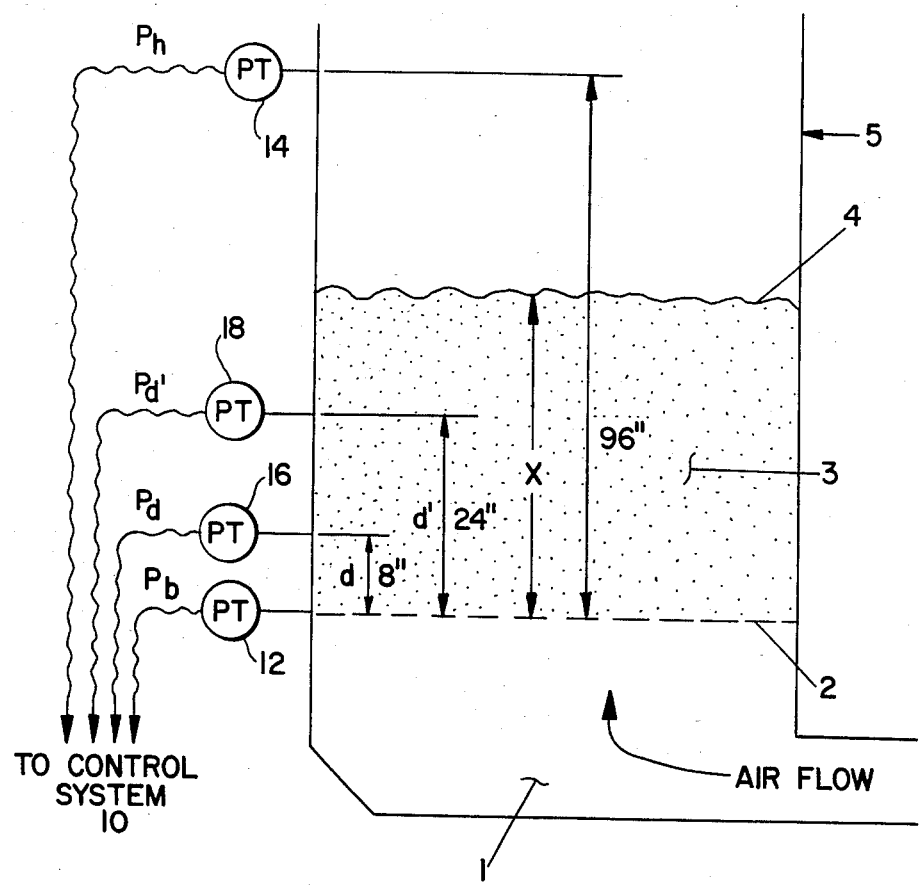
FIG. 1 FLUIDIZED BED SCHEMATIC

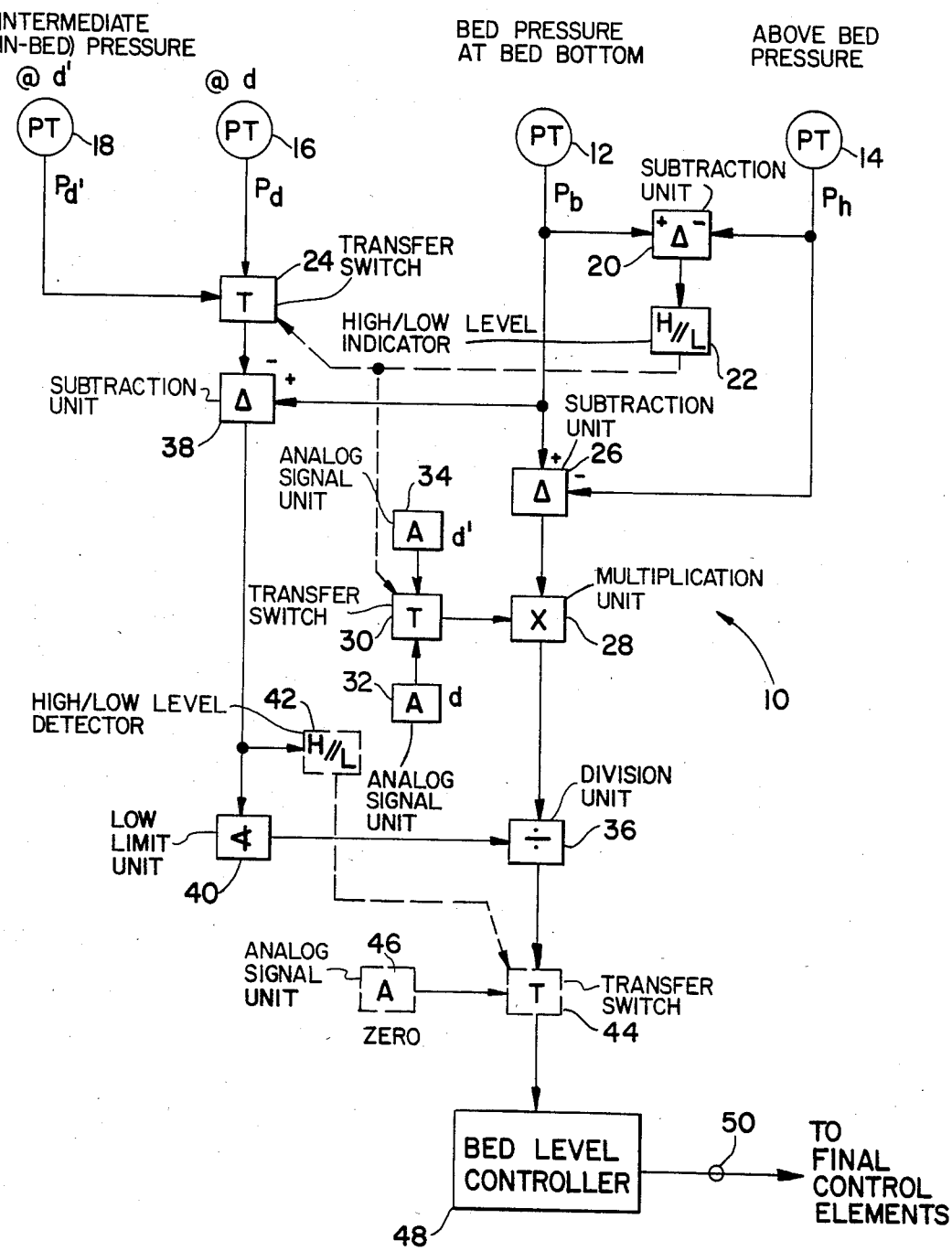
FIG. 2  LOGIC DIAGRAM SCHEMATIC

CONTROL SYSTEM FOR A FLUIDIZED BED

CROSS-REFERENCE TO RELATED APPLICATION

This application is a continuation-in-part of applicants' copending application Ser. No. 450,508 filed Dec. 16, 1982, now abandoned.

BACKGROUND OF THE INVENTION

1. Field of the Invention

The present invention relates generally to a system for controlling the bed level of a fluidized bed, and more particularly to a system for controlling such a bed level which is independent of the density of the bed material.

2. Description of the Related Art

Various methods have been utilized to control the bed level of a fluidized bed. Typically, such methods require the use of a multiplicity of pressure sensors connected to pressure sensing taps located a small distance apart. If a pressure sensor senses a pressure higher than that sensed by the pressure sensor immediately above it, then it is known that the bed level is between these two pressure sensors. The foregoing method has many inherent disadvantages in that a large number of pressure sensors, taps, and sensing lines are required, and the resolution of the system is limited by the distance between adjacent pressure sensing taps. Other measuring systems which use fewer pressure sensing locations require that the density of the bed material be known in order to determine the bed level of the fluidized bed.

Because of the foregoing, it has become desirable to develop a control system which accurately indicates the bed level of a fluidized bed independent of the density of the bed material and with a minimum number of pressure sensors.

SUMMARY OF THE INVENTION

The present invention solves the aforementioned problems associated with the prior art as well as other problems by utilizing a minimum number of pressure sensors to determine the bed level. Pressure sensors are located at the bed bottom, at approximately eight feet above the bed bottom, and at one or more intermediate locations therebetween. Inasmuch as the change in pressure within the fluidized material is approximately linear with respect to bed level and since the pressure is much greater within the fluidized bed than above the top surface of the bed, the foregoing measurements can be utilized in an equation of the form $y = mx + b$ to indicate the bed level.

The foregoing is accomplished in a specific logic arrangement to produce an output signal representative of the bed level. The individual logic symbol or element performing that logic function is conventionally referred to as a function block. Function blocks as used herein can be either stand-alone computational devices or grouped together in any combination in a single computational device, such as a microprocessor.

In view of the foregoing, it will thus be seen that one object of the present invention is to provide a bed level control system for a fluidized bed which is independent of the density of the bed material.

A second object of the present invention is to provide a bed level control system for a fluidized bed having a second intermediate pressure sensor which provides more accuracy at higher bed levels.

A third object of the present invention is to provide a bed level control system for a fluidized bed which indicates a zero bed level when the bed level of the fluidized bed is below a predetermined value.

BRIEF DESCRIPTION OF THE DRAWING

FIG. 1 is a schematic of a fluidized bed using the bed level control system of the present invention.

FIG. 2 is a schematic of the logic arrangement utilized by the bed level control system of FIG. 1.

DESCRIPTION OF THE PREFERRED EMBODIMENT

Referring now to the drawings where the showings are to depict a preferred embodiment of the invention but not limit the invention thereto, FIG. 1 is a schematic of a fluidized bed using the bed level control system of the present invention. A fluidized bed is a system of agitated, solid particles suspended in an upwardly moving stream of air. An air plenum 1 receives a high volume flow of air from a source, such as a fan (not shown). An air distribution plate 2 is located above the air plenum 1 and serves to provide an evenly distributed flow of air into fluidized material 3. The air distribution plate 2 also forms the bed bottom of the fluidized bed. Pressure transmitters 12, 16, and 18 for measuring pressure within the fluidized material and transmitting signals sensed at various levels above the bed bottom are attached to the furnace wall 5.

For example, pressure transmitter 12 measures the pressure, $P_b$, at the bed bottom which is formed by air distributor plate 2, pressure transmitter 16 measures the pressure, $P_d$, at a distance, d, approximately 8 inches above the distributor plate, and pressure transmitter 18 measures the pressure, $P_{d'}$, at a distance approximately 24 inches above the distributor plate.

The use of the second pressure transducer 18 once the bed level of the fluidized bed is greater than d' provides a greater accuracy in indicating the bed level because the inaccuracy in the difference of two measurements is the sum of the inaccuracy of each of the measurements. For example, if a pressure transducer with an inaccuracy of ±0.2% of design span were used it could have an error up to 0.4 inches over a 100 inch span. If the same design span pressure transmitter were used for only a 50 inch measurement it could also produce an error of 0.4 inches. Thus, the closer a pressure transducer is used to its design span, the more accurate is its absolute measurement. However, utilizing a pressure transducer with a large measurement span requires that the bed level of the fluidized bed be in excess of a given value for maximum accuracy. To measure lower bed levels at the same accuracy a pressure transducer with a smaller measurement span is necessary.

Pressure transmitter 14 for measuring the pressure, $P_h$, above the top surface of the fluidized material 4 is also attached to the fluidized bed furnace wall 5 at approximately 96 inches above the distributor plate. The signal outputs from the four pressure transmitters are inputted to the logic system, generally designated 10.

The symbols used herein have the following meanings:

$P_h$ = pressure at some distance h above the bed bottom and outside the fluidized material (inches water)

$P_d$ = pressure at some intermediate distance d above the bed bottom and within the fluidized material (inches water)

$P_{d'}$ = pressure at some other intermediate distance d' above the bed bottom and within the fluidized material (inches water)

$P_b$ = pressure at the fluidized bed bottom (inches water)

h = some distance above the bed bottom and above the surface of the fluidized material (inches)

d = some intermediate distance above the bed bottom and within the fluidized material (inches)

d' = any other intermediate distances greater than d above the bed bottom and within the fluidized material (inches)

$S_{air}$ = density of air (lbs./ ft$^3$)

$S_{bed}$ = density of fluidized material (lbs./ ft$^3$)

X = bed level, i.e. distance surface of the fluidized material is above the bed bottom (inches)

It is generally known that the pressure at any given location within a fluidized bed, such as at the bed bottom or some distance d above the bed bottom, is equal to the pressure above the surface of the fluidized material plus the weight of the material above the location. Thus, the relationship for the pressure at the bed bottom, $P_b$, may be expressed as follows:

$$P_b = P_h + (h-X)S_{air} + XS_{bed} \quad (1)$$

Likewise, the pressure at some intermediate distance d above the bed bottom, $P_d$, may be expressed as follows:

$$P_d = P_h + (h-X)S_{air} + (X-d)S_{bed} \quad (2)$$

Subtracting Equation (2) from (1) yields:

$$P_b - P_d = dS_{bed} \quad (3)$$

Equation (1) also may be expressed as the difference between the pressure at the bed bottom, $P_b$, and the pressure at some distance h above the bed bottom, $P_h$.

$$P_b - P_h = (h-X)S_{air} + XS_{bed} \quad (4)$$

but $S_{air} << S_{bed}$ and, therefore $(h-X)S_{air} << XS_{bed}$ or:

$$(h-X)S_{air} \cong 0 \quad (5)$$

Substituting Equation (5) into Equation (4) and multiplying both sides by d yields:

$$(P_b - P_h)d \cong XS_{bed})d \quad (6)$$

Dividing Equation (6) by Equation (3) yields:

$$\frac{(P_b - P_h)d}{P_b - P_d} \cong \frac{(XS_{bed})d}{S_{bed}d} \quad (7)$$

$$\text{or: } X \cong \frac{(P_b - P_h)d}{P_b - P_d} \quad (8)$$

$$\text{Similarly: } X \cong \frac{(P_b - P_h)d'}{P_b - P_{d'}} \quad (9)$$

FIG. 2 shows a schematic diagram of the logic circuit 10 utilized for controlling the bed level of a fluidized bed.

With particular reference to FIG. 2, the logic circuit 10 is schematically depicted in SAMA Standard RC22-11-1966 notation with the symbols applicable to mechanical, pneumatic, or electronic control systems.

FIG. 2 shows pressure transmitters 12, 16, and 18 for measuring pressure within the fluidized material and transmitting signals sensed at various levels above the bed bottom and one pressure transmitter 14 for measuring the pressure above the top surface of the fluidized material. For example, pressure transmitter 12 measures the pressure, $P_b$, at the bed bottom which is formed by air distributor plate 2, pressure transmitter 16 measures the pressure, $P_d$, at a distance, d, approximately 8 inches above the distributor plate 2, pressure transmitter 18 measures the pressure, $P_{d'}$, at a distance approximately 24 inches above the distributor plate 2 and pressure transmitter 14 measures the pressure, $P_h$, at approximately 96 inches above the distributor plate 2.

The outputs of the pressure transmitters 12 and 14 are connected to the positive and negative inputs, respectively to subtraction unit 20. The output signal produced by the subtraction unit 20 is representative of the difference in the pressure above the top surface of the fluidized material, $P_h$, and the pressure at the bed bottom, $P_b$. This signal is applied to a high and low level detector 22 which is present to actuate when the input signal applied thereto equals or exceeds a pressure of 30 inches of water, and resets when the input signal applied thereto is less than 30 inches of water. Thus, the level detector 22 produces a "high" output signal when the difference between the pressure at the bed bottom, $P_b$, and the pressure above the surface of the fluidized material, $P_h$, is equal to or greater than 30 inches of water and produces a "low" output signal when the difference is less than 30 inches of water.

The output signal produced by the level detector 22 is used as an input signal to a transfer switch 24 whose other inputs are the output signals produced by the pressure transmitters 16 and 18. The transfer switch 24 is actuated in response to the output signal of the level detector 22. Thus, when the output signal of the level detector 22 is "high", thus indicating that the difference between the pressure at the bed bottom, $P_b$, and the pressure above the surface of the fluidized material, $P_h$, is equal to or greater than 30 inches of water, the transfer switch 24 connects the pressure transmitter 18 into the logic circuit 10. In contrast, when the output signal of the level detector 22 is "low", thus indicating that the difference is less than 30 inches of water, the transfer switch 24 connects the pressure transmitter 16 into the logic circuit 10.

The outputs of the pressure transmitters 12 and 14 are also connected to the positive and negative inputs, respectively, of subtraction unit 26. The output signal produced by the subtraction unit 26 is representative of the difference between the pressure at the bed bottom, $P_b$, and the pressure above the surface of the fluidized material, $P_h$. This output signal is used as an input signal to a multiplication unit 28 hereinafter described.

The output signal produced by level detector 22 is also used as an input signal to a transfer switch 30 whose other inputs 32 and 34 are representative of the distances d and d', i.e., the elevation of the pressure transmitters, 16 and 18, respectively, above the bed bottom. As such, unit 32 is representative of the value d=8 inches, which is the elevation of pressure transmitter 16 with respect to the distributor plate 2, whereas unit 34 is representative of the value d=24 inches, which is the approximate elevation of pressure transmitter 18 with respect to the distributor plate 2. The output of the transfer switch 30 is used as the other input to the multiplication unit 28. The output signal produced by the multiplication unit 28 is representative of either the functions $(P_b-P_h)d$ or $(P_b-P_h)d'$ which are the numerators in Equations (8) and (9), respectively. This output signal is used as an input signal to a division unit 36 whose operation will be hereinafter described.

The output of the pressure transmitter 12 and the transfer switch 24 are connected to the positive and negative inputs, respectively, of subtraction unit 38. The output signal produced by the subtraction unit 38 is the difference between the pressure at at the bed bottom, $P_b$, and the pressure at the intermediate locations within the bed, either $P_d$ or $P_{d'}$, and is representative of either the functions $P_b-P_d$ or $P_b-P_{d'}$ which are the denominators in Equations (8) and (9), respectively. This output signal is applied as an input signal to a low limit unit 40 whose output is connected to the other input to the division unit 36. The low limit unit 40 prevents the output of the division unit 36 from approaching infinity as the expressions $P_b-P_d$ or $P_b-P_{d'}$ become incrementally smaller. The output signal produced by the division unit 36 is representative of the bed level X of the fluidized bed as shown in Equations (8) and (9).

As previously mentioned, the low limit unit 40 prevents the division unit 36 from producing an output signal that approaches infinity. As such, low limit unit 40 acts in conjunction with a high and low level detector 42 which is operable when the output signal produced by the subtraction unit 38 is less than 3 inches of water. When this occurs, the high and low level detector 42 produces an output signal which is used as an input signal to a transfer switch 44 whose other input signal is the output signal produced by the division unit 36. Analog signal unit 46 produces a signal representative of "zero" bed height and is connected to the transfer switch 44. During normal operation, the transfer switch 44 permits the signal representative of the bed level X of the fluidized bed to be transmitted therethrough to a bed level controller 48, however, if the high and low level detector 42 determines that the pressure difference between the bed bottom and any intermediate location within the fluidized material is less than 3 inches of water, the transfer switch 44 allows the signal representative of "zero" bed level to be transmitted therethrough to the bed level controller 48. Bed level controller 48, in turn, provides a control signal 50 for controlling the bed level of the fluidized bed.

In operation, at "start-up" the pressure transmitters 12 and 14 sense the pressure at the bed bottom, $P_b$, and the pressure at approximately 96 inches above the distributor plate, $P_h$, respectively. These pressures signals are transmitted to the subtraction unit 20 which produces an output signal representative of the difference in pressure between these two reference points. Typically, at "start-up", this difference in pressure will be less than 30 inches of water. If this is the case, the transfer switch 24 will connect the pressure transmitter 16 into the logic circuit 10. When this occurs the output of the subtraction unit 38, which is representative of the difference between the pressure at the bed bottom and at the location of pressure transmitter 16, is typically less than 3 inches of water. This low pressure difference causes the high and low level detector 42 to actuate which, in turn, causes the transfer switch 44 to allow the unit 44 to pass a signal from analog signal unit 46 representative of "zero" bed level therethrough.

As the bed level X increases, the difference in pressure between the bed bottom and the pressure sensed by pressure transmitter 16 will exceed 3 inches of water causing the high and low level detector 42 to actuate the transfer switch 44 so as to disconnect the unit 46 from the output of the logic circuit. During all of the foregoing, the transfer switch 30 has been actuated so as to cause the unit 32, which is representative of the distance d, i.e., the elevation of the pressure transmitter 16 above the bed bottom, to be connected to the multiplication unit 28, whose output is connected to the input to the division unit 36. The other input to the division unit 36 is the output of the subtraction unit 38 which causes the output of the division unit 36 to be the bed level X. Because of the actuation of the transfer switch 44, the bed level X also appears at the output thereof.

When the difference in pressure between the bed bottom and at approximately 96 inches above the bed bottom equals or exceeds 30 inches of water, the high and low detector 22 causes the transfer switch 24 to connect the pressure transmitter 18 into the logic circuit 10. When this occurs, the transfer switch 30 also causes the unit 34, which is representative of the distance d', i.e., the elevation of the pressure transmitter 18 above the bed bottom, to be connected to multiplication unit 28. Inasmuch as the pressure difference exceeds 3 inches of water, the transfer switch 44 is actuated so that the output of the division unit 36 is passed therethrough. Because of this, the division unit 36 produces the bed level X at its output and this bed level X also appears at the output of the transfer switch 44. The transfer switch 44 allows the signal representative of bed level to be transmitted therethrough to the bed level controller 48. Bed level controller 48, in turn, provides the control signal 50 to the final control element such as a fan (not shown), for controlling the bed level of the fluidized bed.

Even though the foregoing discussion was directed to the filling of the fluidized bed and the actuation of the components in response thereto, the components will operate in a similar manner in static or dynamic environments and in liquid/gas, liquid-gas/gas, and other types of solid-gas/gas systems.

Certain modifications and improvements have been deleted herein for the sake of conciseness and readability but are properly within the scope of the following claims.

We claim:

1. A system for sensing and controlling the bed level of a fluidized bed comprising:
   first pressure sensing means for sensing pressure ($P_b$) substantially at the bottom of said fluidized bed and establishing a signal indicative thereof;
   second pressure sensing means for sensing pressure ($P_b$) above the top surface of said fluidized bed and establishing a signal indicative thereof;
   third pressure sensing means for sensing pressure ($P_d$) between said first and second pressure sensing means so as to be within said fluidized bed and establishing a signal indicative thereof; and
   means for establishing a control signal directly proportional to the difference ($P_b-P_h$) between said signal indicative of the pressure ($P_b$) substantially at the bottom of said fluidized bed and said signal indicative of the pressure ($P_h$) above the top surface of said fluidized bed and inversely proportional to said signal indicative of the pressure ($P_d$)

between said first and second pressure sensing means for controlling an optimized bed level.

2. The system as defined in claim 1 further including means for establishing a signal indicative of a zero bed level in response to a predetermined level of pressure difference ($P_b - P_d$) between said first and third pressure sensing means.

3. The system as defined in claim 1 wherein said control signal inversely proportional to said signal indicative of the pressure ($P_d$) between said first and second pressure sensing means is inversely proportional to the difference ($P_b - P_d$) between said signal indicative of the pressure ($P_b$) substantially at the bottom of said fluidized bed and said signal indicative of the pressure ($P_d$) between said first and second pressure sensing means.

4. The system as defined in claim 3 further including means for establishing a signal indicative of the location (d) of said third pressure sensing means wherein said control signal is directly proportional to the product of the location (d) of said third pressure sensing means and the difference ($P_b - P_h$) between said signal indicative of the pressure ($P_b$) substantially at the bottom of said fluidized bed and said signal indicative of the pressure ($P_h$) above the top surface of said fluidized bed and inversely proportional to the difference ($P_b - P_d$) between said signal indicative of the pressure ($P_b$) substantially at the bottom of said fluidized bed and said signal indicative of the pressure ($P_d$) between said first and second pressure sensing means.

5. The system as defined in claim 1 further including a fourth pressure sensing means for sensing pressure ($P_{d'}$) between said second and third pressure sensing means and establishing a signal indicative thereof, and means for connecting said signal indicative of the pressure ($P_{d'}$) between said second and third pressure sensing means means to the bed level controlling system in place of said signal indicative of the pressure ($P_d$) between said first and second pressure sensing means in response to a predetermined level of pressure difference ($P_b - P_h$) between said first and second pressure sensing means.

6. The system as defined in claim 5 wherein said control signal inversely proportional to said signal indicative of the pressure ($P_{d'}$) between said second and third pressure sensing means is inversely proportional to the difference ($P_b - P_{d'}$) between said signal indicative of the pressure ($P_b$) substantially at the bottom of said fluidized bed and said signal indicative of the pressure ($P_{d'}$) between said second and third pressure sensing means.

7. The system as defined in claim 6 further including means for establishing a signal indicative of the location (d') of said fourth pressure sensing means wherein said control signal is directly proportional to the product of the location (d') of said fourth pressure sensing means and the difference ($P_b - P_h$) between said signal indicative of the pressure ($P_b$) substantially at the bottom of said fluidized bed and said signal indicative of the pressure ($P_h$) above the top surface of said fluidized bed and inversely proportional to the difference ($P_b - P_{d'}$) between said signal indicative of the pressure ($P_b$) substantially at the bottom of said fluidized bed and said signal indicative of the pressure ($P_{d'}$) between said second and third pressure sensing means.

8. A method for sensing and controlling the bed level of a fluidized bed comprising the steps of:

sensing pressure ($P_b$) substantially at the bottom of said fluidized bed and establishing a signal indicative thereof;

sensing pressure ($P_h$) above the top surface of said fluidized bed and establishing a signal indicative thereof;

sensing pressure ($P_d$) between said first and second pressure sensing means so as to be within said fluidized bed and establishing a signal indicative thereof; and establishing a control signal directly proportional to the difference ($P_b - P_h$) between said signal indicative of the pressure ($P_b$) substantially at the bottom of said fluidized bed and said signal indicative of the pressure ($P_h$) above the top surface of said fluidized bed and inversely proportional to said signal indicative of the pressure ($P_d$) between said first and second pressure sensing means for controlling an optimized bed level.

9. The method as defined in claim 8 further including establishing a signal indicative of a zero bed level in response to a predetermined level of pressure difference ($P_b - P_d$) between said first and third pressure sensing means.

10. The method as defined in claim 8 wherein said control signal inversely proportional to said signal indicative of the pressure ($P_d$) between said first and second pressure sensing means is inversely proportional to the difference ($P_b - P_d$) between said signal indicative of the pressure ($P_b$) substantially at the bottom of said fluidized bed and said signal indicative of the pressure ($P_d$) between said first and second pressure sensing means.

11. The method as defined in claim 10 further including establishing a signal indicative of the location (d) of said third pressure sensing means wherein said control signal is directly proportional to the product of the location (d) of said third pressure sensing means and the difference ($P_b - P_h$) between said signal indicative of the pressure ($P_b$) substantially at the bottom of said fluidized bed and said signal indicative of the pressure ($P_h$) above the top surface of said fluidized bed and inversely proportional to the difference ($P_b - P_d$) between said signal indicative of the pressure ($P_d$) between said first and second pressure sensing means.

12. The method as defined in claim 8 further including sensing pressure ($P_{d'}$) between said second and third pressure sensing means and establishing a signal indicative thereof, and connecting said signal indicative of the pressure ($P_{d'}$) between said second and third pressure sensing means to the bed level controlling system in place of said signal indicative of the pressure ($P_d$) between said first and second pressure sensing means in response to a predetermined level of pressure difference ($P_b - P_h$) between said first and second pressure sensing means.

13. The method as defined in claim 12 wherein said control signal inversely proportional to said signal indicative of the pressure ($P_{d'}$) between said second and third pressure sensing means is inversely proportional to the difference ($P_b - P_{d'}$) between said signal indicative of the pressure ($P_b$) substantially at the bottom of said fluidized bed and said signal indicative of the pressure ($P_{d'}$) between said second and third pressure sensing means.

14. The method as defined in claim 13 further including establishing a signal indicative of the location (d') of said fourth pressure sensing means wherein said control signal is directly proportional to the product of the location (d′) of said fourth pressure means and the difference ($P_b - P_h$) between said signal indicative of the pressure ($P_b$) substantially at the bottom of said fluidized bed and said signal indicative of the pressure ($P_h$) above the top surface of said fluidized bed and inversely proportional to the difference ($P_b - P_{d'}$) between said signal indicative of the pressure ($P_b$) substantially at the bottom of said of said fluidized bed and said signal indicative of the pressure ($P_{d'}$) between said second and third pressure sensing means.

* * * * *